United States Patent
Ascanio et al.

[15] 3,683,066
[45] Aug. 8, 1972

[54] TECHNETIUM 99M COLLOIDAL COMPOSITION

[72] Inventors: Ivan Ascanio, 5 Pineybranch Road, Cranbury; Thomas A. Haney, 23 Tall Oaks Road, East Brunswick; Gerald A. Bruno, 115 Obre Place, Shrewsbury, all of N.J.

[22] Filed: Jan. 14, 1969

[21] Appl. No.: 791,173

[52] U.S. Cl....................424/1, 252/301.1 R, 23/134, 252/313 R, 424/DIG. 6
[51] Int. Cl. .............................................A61k 27/04
[58] Field of Search..............................424/1, DIG. 6

[56] References Cited

UNITED STATES PATENTS 3,466,361    9/1969    Richards et al................424/1

OTHER PUBLICATIONS

Corriere et al., The Use of 99M Tc Labeled Sulfur Colloid to Study Particle Dynamics in the Urinary Tract: Vesicaureteral Reflux: 22NSA 28330. July 31, 1968

*Primary Examiner*—Reuben Epstein
*Attorney*—Lawrence S. Levinson and Merle J. Smith

[57]    ABSTRACT

Disclosed herein is a sterile nonpyrogenic composition and method for preparing Technetium 99$m$ sulfur colloid containing a chelating agent utilized in the scanning of liver and other organs of the body.

6 Claims, No Drawings

TECHNETIUM 99M COLLOIDAL COMPOSITION

This invention relates to a composition and method of preparing Technetium 99m sulfur colloid. More particularly, it relates to a composition and method of making this colloid readily available to a practitioner.

The recent introduction of sterile, nonpyrogenic Technetium 99m to the commercial market has opened entirely new vistas for this short-lived isotope. It has resulted in numerous applications which heretofore were unknown. Among these applications is one wherein Technetium 99m is formulated into a sulfur colloid and thereafter injected into a patient. This colloid has been found to localize in various tissues, i.e., liver tissue, thus enabling the medical practitioner to scan the liver for malfunctions using known procedures.

Numerous methods are disclosed in the literature for the preparation of an insoluble colloidal Technetium 99m sulfur composition. One method involves the preparation of insoluble Technetium heptasulfide from sodium pertechnetate solution by utilizing hydrogen sulfide gas.

Another procedure which is fairly simple and efficient for the formation of Technetium 99m sulfur colloid utilizes sodium thiosulfate rather than hydrogen sulfide as a means for forming the Technetium 99m sulfur.

In both of the above methods and in particular the latter, all reagents and procedures for preparing the colloid are generally carried out just prior to utilization by the technician to assure the proper formation of a sulfur colloid. In other words, the colloid is formed utilizing reagents available to the clinician at his laboratory table, since the presence of cations, particularly the polyvalent cations, causes flocculation of the colloid during preparation. Therefore, most of the reagents are prepared by him or made available to him as desired.

An object is the commercial availabilitY of a Technetium 99m sulfur colloid kit.

Another object is the preparation of a Technetium 99m sulfur colloid kit that can be stored for a period of time.

A further object of this invention is a simple and efficient method of preparing Technetium 99m sulfur colloid.

In accordance with this invention a composition comprising sodium thiosulfate, a gelling agent, a buffer and a chelating agent to prevent polyvalent cations from interacting with the colloid is provided to be utilized in the preparation of the Technetium 99m sulfur colloid. The presence of polyvalent cations such as Al, Zn, Fe in the absence of a chelating agent results in a flocculent precipitate during the preparation of the colloid. The large particles formed can result in an undesirable high lung uptake if injected.

By utilizing applicant's thiosulfate reagent compositions, i.e., one containing a chelating agent, it has become possible to transport and/or store sodium thiosulfate over long periods of time for ready use in the preparation of a colloid of Technetium 99m sulfur. Therefore, the procedures known in the art for preparing the Technetium 99m sulfur colloid may be followed in the practice of the instant invention. The most desired procedure, in addition to the procedure hereinafter set forth, is the one described in the article, "Preparation, Distribution and Utilization of Technetium 99m Sulfur Colloid" by Stern, H. S., Macafee, J. G., and Subramanian, G., appearing in the *Journal of Nuclear Medicine*, Volume 7, pages 665 to 675 (1966).

Essentially, the invention allows the reagents to be prepared in one location, transported and utilized at a separate location when the need arises without formation of flocculent precipitate caused by polyvalent cations which may be leached from the walls, stoppers, or the like of the shipping container. Applicant's reagents thus enable the reduction of pertechnetate with acid and sodium thiosulfate in the presence of either gelatin or carboxymethylcellulose to form the desired colloid. The thiosulfate is converted to polythionic acid which is the stabilizing electrolyte of this colloid.

The reagents of the instant invention are prepared in separate vials or containers identified as: (1) reagent solution; (2) buffer solution; and (3) acid solution. In each instance the proportions of reagents utilized are prepared to form an isotonic solution capable of injection into the human blood stream. The reagent solution contains a gelling agent, e.g., gelatin, carboxymethylcellulose or other gelling agent, sodium thiosulfate and a chelating agent in desired proportions.

The buffer solution may be a solution of sodium biphosphate and sodium hydroxide in known proportions. However, any buffer solution known to the art and capable of utilization in this system may also be substituted for the above system. The acid solution is one which will cause the liberation of sulfur from the sodium thiosulfate and allow it to react with Technetium. Among the ones most suitable are hydrochloric acid, sulfuric acid, etc.

Examples of chelating agents which may be present in the reagent vial and form part of the novel compositions of this invention are: [[(1,2-cyclohexylene)oxyethylene]dinitrillo]tetraacetic acid; [oxybis(ethylenenitrilo)]tetraacetic acid; (1,2-cyclohexylenedinitrilo)tetraacetic acid; N-[5-[3-[(5-aminopentyl)hydroxycarbamoyl]propionamido]-pentyl]-3-[[5-(N-hydroxyacetamido)pentyl]carbamoyl]propionhydroxamic acid; diethyldithiocarbamic acid sodium salt; (diethylenetrinitrilo)pentaacetic acid; (diethylenetrinitrilo)pentaacetic acid pentaethyl ester; (ethyldinitrilo)tetraacetic acid; [[2-(3-oxomorpholino)ethyl]imino]-diacetic acid, diethyl ester; [(2-mercaptoethyl)imino]diacetic acid.

Illustrations of additional chelating agents can be found in "Scientific American," May, 1966, pages 40 to 50. It is to be understood that the chelating agents listed are considered to be the most preferred chelating agents for the invention.

It is preferred that the chelating agent be present in about 0.09 to about 1.0 percent in the total solution, with the best results being achieved when the chelating agent is present in the total solution of about 0.09 to about 1.0 percent. These chelating agents are only representative and it is to be understood that physiologically acceptable chelating agents are within the purview of this invention. It is understood that other medical chelating agents utilized in medicine may also be used in the composition of the instant invention. In addition, although the chelating agent is preferred to be present in the reagent vial, it may be present in either of the other vials.

The pertechnetate is obtainable from any sterile generator of the nature illustrated by U. S. Pat. No. 3,369,121. In practice following sterile and antiseptic conditions an eluate of Technetium 99m as obtained from a sterile Technetium generator, as indicated above, is injected into the vial containing the reagent solution. Thereafter, hydrochloric acid of predetermined quantity is injected into the sterile contents of this vial and the vial is then agitated. The mixture is then heated for a sufficient time period at a temperature of from about 85° to 105° C. for proper colloidal formation, thereafter this colloid is cooled. As the colloid is cooling, the buffer solution is placed into the sterile contents of the reagent vial, The following examples illustrate the invention, all temperatures are in degrees Centigrade unless otherwise specified:

EXAMPLE 1

Vials containing the following reagents were prepared:

Vial A - Reagent Solution
   4 mg. sodium thiosulfate
   3 mg. gelatin
   8.5 mg. potassium phosphate
   0.9 mg. disodium edetate in
      each ml. of sterile water and
   3 ml. are present in the vial.
Vial B - Buffer Solution
   35 mg. sodium biphosphate
   10 mg. sodium hydroxide in
      each ml. of sterile water and
   2 ml. are present in the vial.
Vial C - Acid Solution
   9 mg. of 0.25 N hydrochloric
      in each ml. and
   2.0 ml. are present in the vial.

EXAMPLE 2

Technetium 99m (0.1–5 ml.) is aseptically injected into Vial A. The contents of Vial C are thereafter similarly injected into Vial A and the contents then agitated and heated to a temperature of about 90° to 100° C. for 10 minutes to allow formation of the colloid. After heating for about 10 minutes, vial A is allowed to cool and the contents of vial B are injected into it.

Similar results were obtained when the reagents in Vials A, B, and C were allowed to stand for periods of time varying from one week to several.

The invention may be variously otherwise embodied within the scope of the appended claims.

What is claimed is:

1. A kit for preparing Technetium 99m sulfur colloid which comprises in separate containers
   a. a reagent solution containing a gelling agent sodium thiosulfate
   b. a buffer solution
   c. an acid solution, and
   d. a chelating agent which is present in any of the above containers in order to prevent flocculation.

2. A kit in accordance with claim 1 wherein the chelating agent is selected from the group consisting of: [[(1,2a-cyclohexylene)oxyethylene]dinitrillo]-tetraacetic acid; [oxybis(ethylenenitrilo)]tetraacetic acid; (1,2-cyclohexylenedinitrilo)tetraacetic acid; N-[5-[3-[(5-aminopentyl)hydroxycarbamoyl] propionamido]pentyl]-3-[[5-(N-hydroxyacetamido)pentyl]carbamoyl]propionhydroxamic acid; diethyldithiocarbamic acid sodium salt; (diethylenetrinitrilo)-pentaacetic acid; (diethylenetrinitrilo)pentaacetic acid pentaethyl ester; (ethylenedinitrilo)tetraacetic acid; [[2-(3-oxomorpholino)ethyl]imino]diacetic acid, diethyl ester; disodium edetate and [(2-mercaptoethyl)imino] diacetic acid.

3. In a process for preparing a Technetium 99m sulfur colloid which comprises reacting sodium thiosulfate with an acid in the presence of a gelling agent, the improvement wherein a chelating agent is included in order to prevent flocculation.

4. A process in accordance with claim 3 wherein the chelating agent is selected from the group consisting of [[(1,2]dinitrillo]tetraacetic acid; [oxybis(ethylenenitrilo)]tetraacetic acid; (1,2-cyclohexylenedinitrilo)tetraacetic acid; N-[5-[3-[(5-aminopentyl)-hydroxycarbamoyl]propionamido]pentyl]-3-[[5-(N-hydroxyacetamido)-pentyl]carbamoyl]propionhydroxamic acid; diethyldithiocarbamic acid sodium salt; (diethylenetrinitrilo)pentaacetic acid; (diethylenetrinitrilo)pentaacetic acid pentaethyl ester; (ethylenedinitrilo)-tetraacetic acid; [[2-(3-oxomorpholino)ethyl]imino]diacetic acid, diethyl ester; and [(2-mercaptoethyl)imino]diacetic acid.

5. A process in accordance with claim 3 wherein the chelating agent is present in about 0.09 to 1.0 percent of the total solution.

6. A kit in accordance with claim 2 wherein the chelating agent is present in about 0.09 to about 1.0 percent of the total solution.

* * * * *